US007335695B2

(12) United States Patent
Bagala et al.

(10) Patent No.: US 7,335,695 B2
(45) Date of Patent: Feb. 26, 2008

(54) POWDER COATING PRECURSORS AND THE USE THEREOF IN POWDER COATING COMPOSITIONS

(75) Inventors: Joseph Bagala, Peekskill, NY (US); Thomas Chirayil, Danbury, CT (US); William Sullivan, Ossining, NY (US)

(73) Assignee: Engelhard Corporation, Florham Park, NJ (US)

( * ) Notice: Subject to any disclaimer, the term of this patent is extended or adjusted under 35 U.S.C. 154(b) by 441 days.

(21) Appl. No.: 10/879,661

(22) Filed: Jun. 29, 2004

(65) Prior Publication Data

US 2005/0014865 A1  Jan. 20, 2005

Related U.S. Application Data

(60) Provisional application No. 60/488,366, filed on Jul. 18, 2003.

(51) Int. Cl.
*C04B 14/20* (2006.01)
(52) U.S. Cl. .................. 524/430; 524/449; 523/171
(58) Field of Classification Search ............... 523/171; 524/449, 444, 430
See application file for complete search history.

(56) References Cited

U.S. PATENT DOCUMENTS

| 4,192,691 | A |   | 3/1980  | Armanini ................. 106/291 |
| 4,308,312 | A |   | 12/1981 | Urban et al. ............. 428/241 |
| 5,091,011 | A |   | 2/1992  | DeLuca .................... 106/417 |
| 5,187,220 | A |   | 2/1993  | Richart et al. .......... 524/441 |
| 5,423,912 | A | * | 6/1995  | Sullivan et al. ......... 106/417 |
| 5,441,774 | A |   | 8/1995  | Dutta et al. ............. 427/476 |
| 5,611,851 | A |   | 3/1997  | DeLuca et al. .......... 106/415 |
| 5,741,355 | A |   | 4/1998  | Yamamoto et al. ...... 106/417 |
| 5,759,255 | A | * | 6/1998  | Venturini et al. ........ 106/418 |
| 5,824,144 | A |   | 10/1998 | He et al. .................. 106/403 |
| 6,045,914 | A |   | 4/2000  | Sullivan et al. .......... 428/404 |
| 6,176,918 | B1 |  | 1/2001  | Glausch et al. .......... 106/415 |
| 6,245,323 | B1 |  | 6/2001  | Christie et al. ............ 424/63 |
| 6,325,846 | B1 | * | 12/2001 | Bagala et al. ............ 106/415 |
| 6,524,661 | B2 | * | 2/2003  | Bagala et al. ............ 427/475 |
| 6,533,858 | B1 | * | 3/2003  | Cacace et al. ........... 106/416 |
| 6,783,584 | B2 | * | 8/2004  | Takahashi ................ 106/403 |
| 7,081,488 | B2 | * | 7/2006  | Bardman et al. ........ 523/200 |
| 2006/0009546 | A1 | * | 1/2006 | Brown ..................... 523/212 |

FOREIGN PATENT DOCUMENTS

| WO | WO 97/29059 A | 8/1997  |
| WO | WO 99/35184 A | 7/1999  |
| WO | WO 01/98421 A | 12/2001 |

OTHER PUBLICATIONS

PCT International Search Report for PCT/US2004/023245.

* cited by examiner

*Primary Examiner*—Katarzyna Wyrozebski
(74) *Attorney, Agent, or Firm*—Raymond F. Keller; Melanie L. Brown

(57) ABSTRACT

A laminar pigment which has hydrolyzed silane coupling agent treated surface is used as a pigment for a powder coating composition. By combining the pigment with a powdery film-forming polymer, a film-forming composition, which can be applied by electrostatic coating is produced. With the addition of leveling agent to the silane treated products, the spray properties of effect pigments are improved. The products of this invention are useful in all types of automotive and industrial paint applications.

16 Claims, 5 Drawing Sheets

POWDER COATING PRECURSORS AND THE USE THEREOF IN POWDER COATING COMPOSITIONS

This patent application claims the benefit of pending U.S. Ser. 60/488,366 filed Jul. 18, 2003.

BACKGROUND OF THE INVENTION

The electrostatic coating process for the application of color coatings on various substrates is well known. This process uses a composition that is an electrically chargeable powder mixture of a film-forming polymer and a pigment (or pigments) having the desired color. Unfortunately, preparation of such powder coating compositions for application by a powder spray applicator has presented a problem in the past in connection with platy pigments.

Pearlescent or nacreous pigments simulate the effect of natural pearl and are composed of thin platelets that are transparent in the visible region of the spectrum. The platelets are very smooth and part of the light that strikes the platelets is reflected and part is transmitted through the platelets. That part of the light that is transmitted is subsequently reflected by other layers of platelets. The result is that multiple reflections from many layers occur and this results in depth of sheen since the eye cannot focus on one particular layer.

The reflection that occurs is specular in that the angle of incidence equals the angle of reflection. The amount of light reflected at non-specular angles is small and the amount of light reflected diminishes very quickly as the specular angle is passed. The result is that pearlescent pigments are extremely sensitive to viewing angle. In order for the maximum amount of light to be reflected, the platelets must be extremely smooth. Any surface roughness causes light to be scattered in a non-specular manner and diminishes the lustrous effect.

The platelets must be aligned parallel to each other and to the substrate for maximum reflectivity. If not so aligned, light will be reflected randomly and again, luster will diminish. The amount of light that is reflected depends on the index of refraction. As the index of refraction increases, the amount of reflected light increases.

Platy pigments of a metallic material rely on their laminar structure for maximum appearance effect. Such plates include, for instance, metallic flakes such as aluminum, bronze and stainless steel plates as well as natural or synthetic pearlescent pigments exemplified by, e.g., natural pearlescence or a metal oxide-coated substrate such as titanium dioxide-coated mica, iron oxide-coated mica, titanium dioxide-coated glass, iron oxide-coated glass, and iron-coated aluminum flakes. The laminar structure of such metallic or pearlescent pigments is destroyed during the extrusion or grinding processes, which are used in the manufacture of powder coating compositions and as a result, the coating appearance achieved exhibits a reduced luster effect.

The industry has attempted to avoid the foregoing problem by dry blending the pigments and polymer powder, i.e., the polymer carrier is mechanically blended with the pigment. Unfortunately, the pigment and the powder particles usually develop a different charge magnitude, which results in application issues and color shift when the powder coating composition is electrostatically sprayed on a substrate. In addition, the pigments have a tendency to separate from the polymer powder in that volume of the powder spray composition, that does not attach to the substrate and is then recovered. As a result, the recovered oversprayed material is difficult to reuse.

To overcome the problems encountered as a result of the dry blending process, a blending process in which the powder base and the pigment were mixed and then heated to a temperature sufficient to soften the surface of the powder particles so that the pigment could bind to the surface of such particles was developed, as described in U.S. Pat. No. 5,187,220. While this process works well for corona electrostatic charging and alleviates the problems with reusing the powder over spray, it is a rather costly process.

A significant advance in the art is described in U.S. Pat. No. 5,824,144, the disclosure of which is hereby incorporated by reference. The described metal containing platelet pigment is provided with a viscous surface layer of polymer or other sticky liquid material. When that treated pigment is blended with powder coating composition, the powder attaches to the surface of the pigment thereby minimizing color separation. The pigment is also encapsulated by the powder to thereby present a single surface. A better charge of those pigment particles which do not become attached to the powder materials is also realized.

A significant problem in connection with the use of metal-containing platelet pigments in a powder coating composition is that the concentration of the pigment which can be incorporated is limited. While pigment amounts of up to about 10% or more can be utilized in single application environments or in the laboratory, the concentration is limited to about 3% when operating on a larger scale as is required commercially. At levels higher than about 3%, numerous problems arise. These include spray gun clogging and tip build-up, blotchy panel appearance and color separation.

It has been discovered that a treatment which had previously been developed for pearlescent pigments intended for exterior use to provide improved humidity, resistance and overall weatherability and which was used in liquid coating systems such as a solvent or water borne automotive paint systems, for example, pigmented base coat and clear top coat, provides superior properties in the context of powder coatings. The exterior pigment treatment surprisingly improves the application properties of the pigment when incorporated into powder coatings. Such improvements include less build up of the pigment at the electrostatic gun tip, improved transfer through feed lines, improved transfer efficiency of the pigment and a more uniform coating appearance. Commonly assigned U.S. Pat. No. 6,524,661 teaches an improved pearlescent pigment powder coating composition comprising a mixture of a particulate resin carrier and a particulate pigment in which the pigment is a laminar metal-containing pigment having a first coating of a hydrated aluminum oxide or hydrated cerium and aluminum oxides and a coating of a hydrolyzed silane coupling agent or intermingled with the first coating. A Scanning Electron-imaging Microscopy (SEM) image of such a product is shown in FIG. 4. The SEM image shows titanium oxide coated mica platelet with the silane surface treatment at a magnification of 5,500× and 33,000×. The powder coating mix consisting of the exterior treated pigment has the advantage of minimizing the pigment separation at the gun tip, but affects the quality of the film of the coated part once powder is cured. We believe that the aluminum hydroxide is not present on the outer surface of the silane coating. See also U.S. Pat. No. 6,176,918. Thus, due to the surface energy differences between the silane coated pearlescent pigment and resin, the cured powder coated film has a textured or orange-peel-like appearance.

It is known in the industry to add aluminum oxide to powder coating compositions by either preblending the aluminum oxide with resin and then mixing the preblend with pearlescent pigment or simultaneously mixing aluminum oxide, resin, and pearlescent pigment together. See Nargiello, Fumed Metallic Oxides Improve Powder Processing and Application, Volume 4(3), pages 16-20 (June 1993). As shown in Comparative 5 below, spraying the simultaneously made mixture onto a panel did not provide any appearance improvement.

SUMMARY OF THE INVENTION

The present invention relates to an improved pearlescent pigment powder coating composition and powder coating method. More particularly, the present invention relates to a powder coating composition comprising a mixture of a particulate resin carrier; particulate pigment in which the pigment is a laminar metal-containing pigment having a coating of hydrolyzed silane coupling agent; and leveling agent. Use of this powder coating composition provides an improved powder coating application method by eliminating the pigment separation problem during the powder spray out and significantly improving the panel appearance once the powder is cured. The addition of aluminum oxide onto the surface of the silane coated pearlescent pigment changes the surface energy of the pigment and allows better compatibility with powder resin systems during the curing process.

Thus, the present invention is directed to a powder coating precursor comprising: (a) pearlescent pigment coated with at least one silane coupling agent; and (b) leveling agent that is present on the outer surface of the silane coated pearlescent pigment (a).

The present invention also provides a method of powder coating composition preparation comprising the steps of: (a) combining: (i) pearlescent pigment coated with at least one silane coupling agent; and (ii) leveling agent to form a powder coating precursor wherein the leveling agent is present on the outer surface of the silane coated pearlescent pigment; and (b) adding resin to said powder coating precursor (a).

DESCRIPTION OF THE INVENTION

The powder coating composition of the present invention is the conventional powder coating composition for electrostatic application as a result of dry blending in which the pigment has been treated as described below. Thus any known particulate resin carrier used heretofore can also be used in the composition and process of the present invention. As a result of the improved pigment utilized in the present invention, the pigment concentration can be typically up to about 15% of the total powder. Typically, depending on the effect desired, the pigment will constitute about 1 to 8% of the composition.

Pearlescent Pigment:

The pigment of the present invention is laminar substrate, that is, it is a platelet-like pigment. The platelets may be made of a reflective metal such as aluminum, bronze or stainless steel in the form of flakes or also may be any natural or synthetic pearlescent pigment. Other useful substrate materials include natural mica, synthetic mica, aluminum oxide, bismuth oxychloride, boron nitride, silicon dioxide, copper flake, copper alloy flake, zinc flake, zinc alloy flake, enamel, china clay, and porcelain. Useful glass flakes are disclosed in commonly assigned U.S. Pat. No. 6,045,914 incorporated herein by reference. Glass flakes are resilient and can be optically attractive as well. Useful glass flakes are disclosed in commonly assigned U.S. Pat. No. 6,045,914 incorporated herein by reference. Useful synthetic mica substrate is disclosed in U.S. Pat. No. 5,741,355 incorporated herein by reference. Preferably, the substrate has a length of about 2.5 microns to about 200 microns and a thickness of about 0.05 micron to about 5 microns.

A mixture of substrates may also be used. In a substrate mixture, different materials and/or substrates used in the present invention may have any morphology including platelet, spherical, cubical, acicular, whiskers, or fibrous. Examples of useful platy materials include platy aluminum oxide, platy glass, aluminum, mica, bismuth oxychloride, platy iron oxide, platy graphite, platy silica, bronze, stainless steel, natural pearl, boron nitride, silicon dioxide, copper flake, copper alloy flake, zinc flake, zinc alloy flake, zinc oxide, enamel, china clay, and porcelain and the like. Any combination of the preceding platy materials or at least one of the preceding platy materials and at least one non-platy material may be used.

Examples of useful metal oxides include but not are limited to titanium dioxide including both the anatase and rutile forms, iron oxide including $Fe_2O_3$ and $Fe_3O_4$, silicon oxide, zinc oxide, and zirconium oxide. Multiple layers of different metal oxides may be used.

Figure 1:
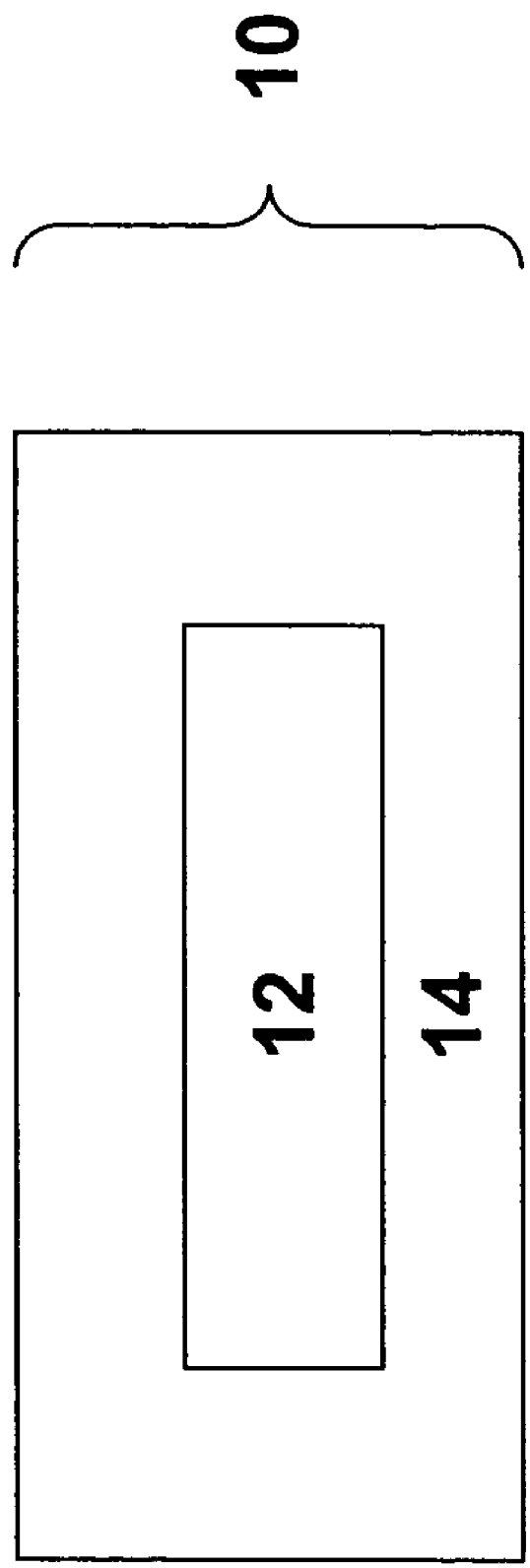
FIG. 1 illustrates a pearlescent pigment.

Natural pearlescent pigments include natural pearlescence and the synthetic pigments include metal oxide-coated mica pigments, metal oxide-coated glass flakes, iron-coated aluminum flakes, and reduced titanium-coated micas. Platy pigments such as the platy titanium dioxide disclosed in commonly assigned U.S. Pat. Nos. 4,192,691 or 5,611,691 may also be used in the present invention. In FIG. 1, pearlescent pigment 10 comprises substrate 12 coated with metal oxide 14.

The pearlescent pigment of this invention is additionally treated with a hydrolyzed silane coupling agent or a mixture of such agents. These, as known, are compounds which act as an interface between an organic material and an inorganic material to enhance the affinity between the two. Thus, the silane-coupling agents generally have both an organo functional group and a silicon functional group bonded either directly or indirectly to silicon. The silicon functional groups are generally alkoxy groups and preferably $C_{1-4}$ alkoxy groups. Particularly useful organo functional groups are epoxies and amino alkyls.

Examples of silane coupling agents which can be used in the present invention are gamma-(2-aminoethyl)aminopropyltrimethoxysilane, aminopropyl trimethoxysilane, gamma-aminopropyltriethoxysilane, gamma-(2-aminoethyl)aminopropylmethyldimethoxysilane, gamma-methacryloxypropylmethyltrimethoxysilane, gamma-metacyryloxypropyltrimethoxysilane, gamma-glycidoxypropyl trimethoxysilane, gamma-mercaptopropyltrimethoxysilane, vinyltriacetoxysilane, gamma-chloropropyltrimethoxy silane, vinyltrimethoxysilane, trimethylchlorosilane, gamma-isocyanatopropyltriethoxysilane and the like.

The silane coupling agent should be selected so that it is suitable for any organic material which will be combined with the pigment in use.

The pigment is treated with the silane coupling agent by dry or wet mixing. For instance, an aqueous solution of the agent in water or a mixture of water and an organic solvent can be added to an aqueous slurry of the pigment. The silane is preferably prehydrolyzed such as, for instance, by stirring the coupling agent in water for a suitable period of time. It is also possible to effect hydrolyzation at the time of mixing. In general, about 0.1 to 10 wt %, preferably about 0.25 to 5 wt %, of the silane coupling agent is used based on 100 parts by weight of pigment being treated. The coupling agent and pigment are combined for a period of time sufficient to allow reaction to occur, which may last from a few minutes to several hours or more, preferably about 3 to 24 hours. Thereafter the treated pigment can be recovered in the conventional fashion such as by filtration, centrifugation and the like, and dried. It is also possible to combine, if desired, the coupling agent treatment with the aluminum/cerium treatment. See also commonly assigned U.S. Pat. No. 5,759,255 incorporated herein by reference.

Figure 2:
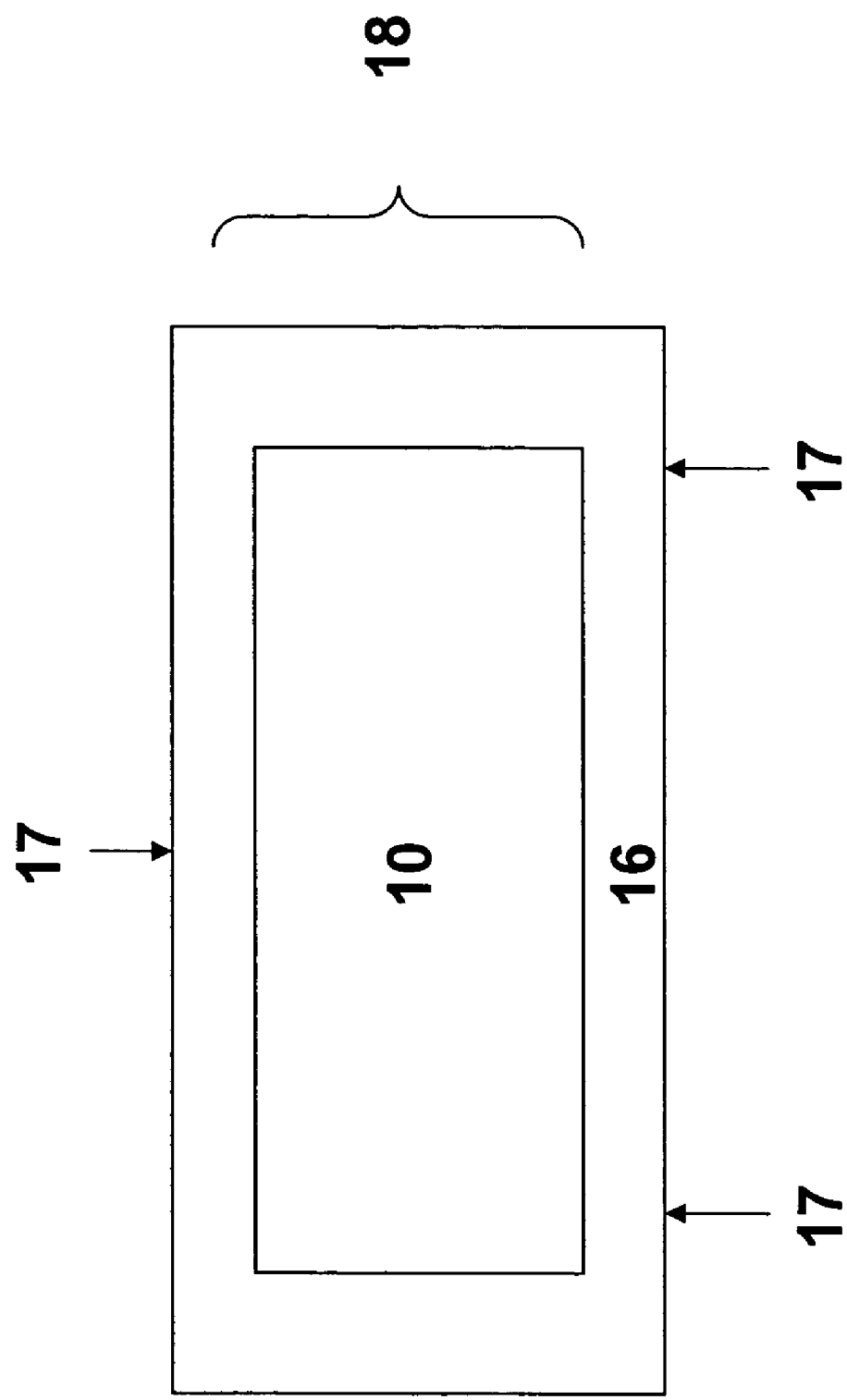
FIG. 2 illustrates one type of silane coated pearlescent pigment.

The phrase "silane coated pearlescent pigment" means that the silane forms at least a partial coating around the pearlescent pigment and thus, the pearlescent pigment may be partially or completely coated by silane. As an example, in FIG. 2, pearlescent pigment 10 from FIG. 1 is completely coated with silane 16 to form silane coated pearlescent pigment 18. The surface of the silane that is not in contact with the pearlescent pigment is referred to herein as the "outer surface". The outer surface 17 is shown in attached FIG. 2.

Coating of a metal oxide-coated mica pigment with a hydrous aluminum oxide per se is known and may optionally be used on the pearlescent pigment prior to coating with silane. It is described, for example, in commonly assigned U.S. Pat. No. 5,091,011, the disclosure of which is incorporated herein by reference. Briefly, the pigment is dispersed by stirring in water and then an aluminum compound such as aluminum chloride, aluminum sulfate or aluminum potassium sulfate, and a neutralizing agent such as sodium hydroxide, potassium hydroxide ammonia or urea, are added simultaneously as aqueous solutions. The resulting hydrolysis causes the hydrous oxide to deposit on the substrate. As described, the aluminum compound must be added slowly enough to permit the formation of a smooth, continuous layer on the platelets and the rate should fall within the range of about 0.03 to 0.1 mg Al per minute per gram of pigment, preferably about 0.005 to 0.07 mg Al/min/g pigment. A quantity of aluminum compound solution is used so as to produce a hydrous aluminum oxide coating containing about 0.05 to 1.2% aluminum, and preferably about 0.1 to 0.8% aluminum, based on the total weight of the pigment. Pigments in which the concentration of aluminum is about 1.2% are less effective in stabilization than lower concentrations. After deposition of the coating, the product can be filtered, washed with water and dried at any convenient temperature. Use of a temperature which is high enough to calcine the hydrous aluminum oxide should be avoided. The silane as described above would then be coated as described above onto the aluminum hydroxide coated pearlescent pigment.

The coating of the pigments with a coating consisting essentially of a combination of hydrated cerium and aluminum oxides is also per se known and may optionally be used on the pearlescent pigment prior to coating with silane. It is described, for instance, in commonly assigned U.S. Pat. No. 5,423,912, the disclosure of which is incorporated herein by reference. Briefly, the pigment is dispersed in a liquid from which the cerium and aluminum can be readily precipitated onto the surface of the pigment. This conveniently, and preferably, is an aqueous dispersion. The solid pigment in the dispersion generally comprises about 5 to 30%, preferably about 10 to 20%, and the cerium and aluminum are each added to the dispersion in the form of a salt which is soluble in a liquid medium. While other salts can be used, the nitrate salts are preferred. It is also preferred to deposit about 0.1-1.5% cerium hydroxide, more preferably 0.2-0.6%, calculated as weight percent cerium and about 0.1-1%, more preferably 0.2-0.6%, aluminum hydroxide, calculated as weight percent aluminum, based on the weight of the pigment. The salts can be added to the slurry individually in either order and precipitated or preferably, added simultaneously and precipitated. Precipitation is controlled by raising the pH to a value greater than about 5, preferably to a value of about 5.5-7.5. After completion of the precipitation step, the treated product is separated from the dispersion by any convenient means such as, for instance, filtration, centrifugation or settling, washed and dried. The silane as described above would then be coated as described above onto the cerium and aluminum hydroxide coated pearlescent pigment.

Useful preferred pearlescent pigments are commercially available from Engelhard Corporation and described below:

| ENGELHARD PIGMENT | COMPOSITION |
| --- | --- |
| MAGNAPEARL ® 1103 pearlescent pigment | mica platelets (61-77 weight percent) coated with TiO$_2$ (22-34 weight percent) coated with cerium hydroxide/polymer network (1-4 weight percent) and stannic oxide (less than one weight percent) |
| MAGNAPEARL ® 2103 pearlescent pigment | mica platelets (50-66 weight percent) coated with TiO$_2$ (33-45 weight percent) coated with cerium hydroxide/polymer network (1-4 weight percent) and stannic oxide (less than one weight percent) |
| MAGNAPEARL ® 3103 pearlescent pigment | mica platelets (43-58 weight percent) coated with TiO$_2$ (41-51 weight percent) coated with cerium hydroxide/polymer network (1-4 weight percent) and stannic oxide (less than 0.3 weight percent) |
| LUMINA ® pearlescent pigment | mica platelets (28.3-40.3 weight percent) coated with TiO$_2$ (58.7-66.7 weight percent) coated with cerium hydroxide/polymer network (1-4 weight percent) and stannic oxide (less than one weight percent) |
| MEARLIN ® super copper pearlescent pigment | mica platelets (46-65 weight percent) coated with iron oxide (34-50 weight percent) coated with cerium hydroxide/polymer network (1-4 weight percent) |
| MEARLIN ® fine pearl pearlescent pigment | mica platelets (53-64 weight percent) coated with TiO$_2$ (34-41 weight percent) coated with cerium hydroxide/polymer network (1-4 weight percent) and stannic oxide (less than one weight percent) |
| MEARLIN ® bright silver pearlescent pigment | mica platelets (66-75 weight percent) coated with TiO$_2$ (24-30 weight percent) coated with cerium hydroxide/polymer network (1-4 weight percent) and stannic oxide (less than one weight percent) |
| MEARLIN ® super red pearlescent pigment | mica platelets (43-57 weight percent) coated with TiO$_2$ (42-52 weight percent) coated with cerium hydroxide/polymer network |

| ENGELHARD PIGMENT | COMPOSITION |
|---|---|
| | (1-4 weight percent) and stannic oxide (less than one weight percent) |

Leveling Agent:

In particular, the leveling agent is selected from the group consisting of aluminum oxide, carbon nanotubule, titanium oxide, zinc oxide, or zirconium oxide.

Figure 3:
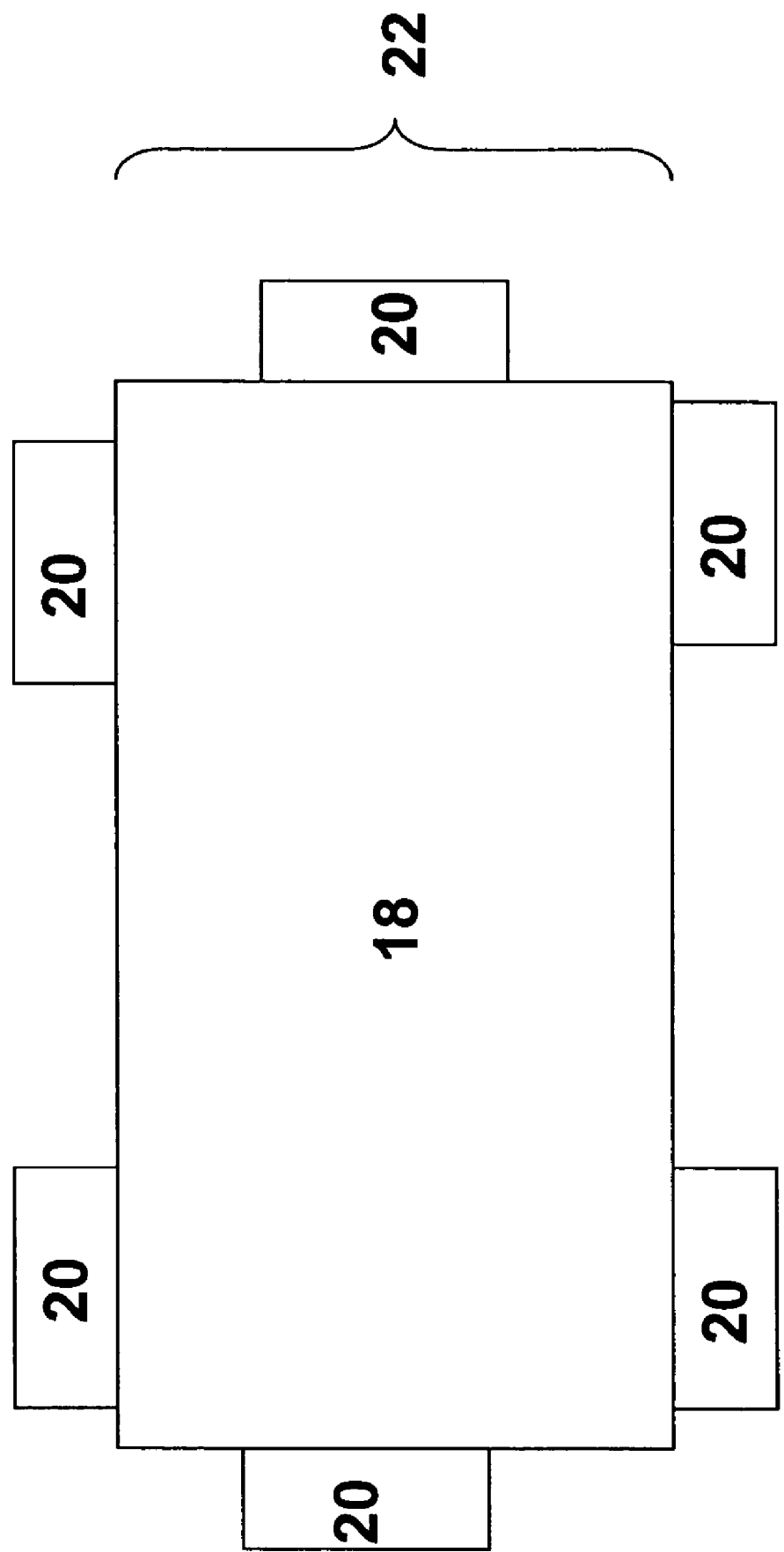
FIG. 3 illustrates one embodiment of the present powder coating precursor.
Figure 4:
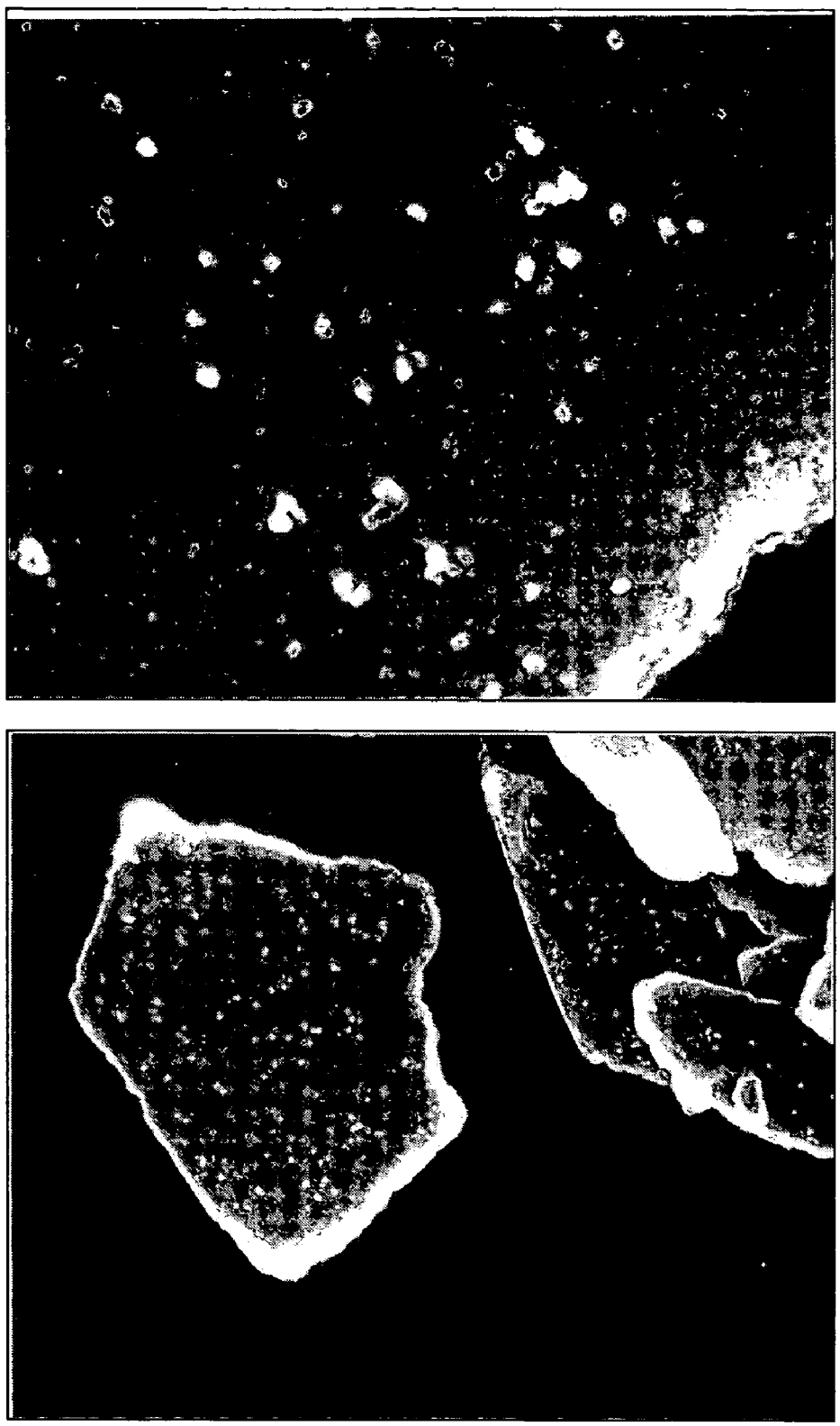
FIG. 4 is SEMs of a prior art product.
Figure 5:
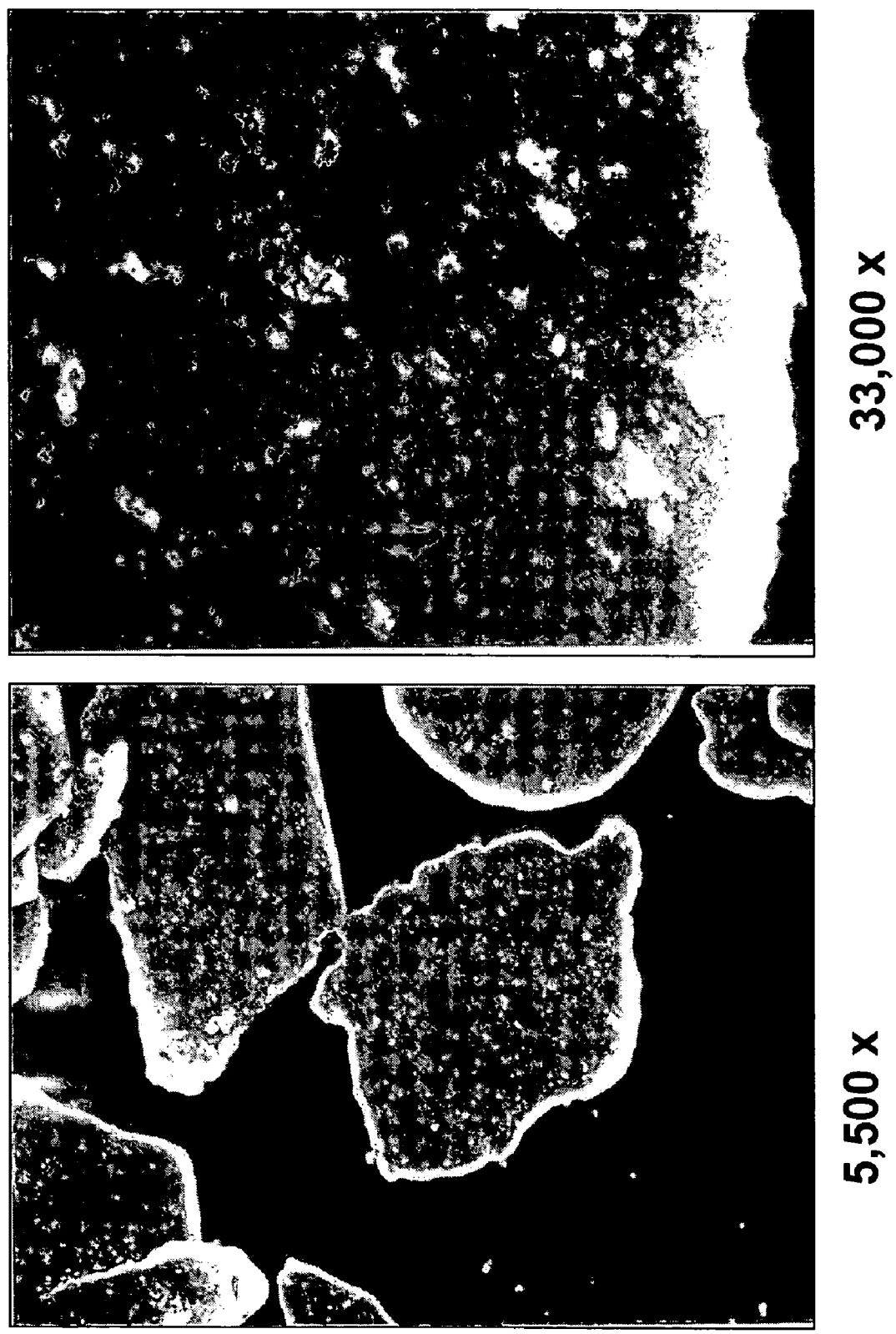
FIG. 5 is SEMs of one embodiment of the present powder coating precursor.

The leveling agent is physically mixed with the silane coated pearlescent pigment. As an example, the preceding mixture may be placed in a paint can with a baffle and shaken on a paint shaker until the aluminum oxide is well dispersed. The result is a silane coated pearlescent pigment having leveling agent on the outer surface of the silane. Based on the physical mixing, the leveling agent may be in the form of islands or aggregates on the silane outer surface. This inventive result is in contrast to the industry practice where aluminum oxide is added to powder coating compositions by either preblending the aluminum oxide with resin and then mixing the preblend with pearlescent pigment or simultaneously mixing aluminum oxide, resin, and pearlescent pigment together. We believe that this industry practice does not result in leveling agent being present on the outer surface of the silane to the same extent as the present invention. The inventive silane coated pearlescent pigment having leveling agent on the outer surface of the silane is referred to herein as "powder coating precursor". As a non-limiting example, in FIG. 3, the silane coated pearlescent pigment 18 of FIG. 2 has leveling agent 20 on the outer silane surface to form powder coating precursor 22. FIG. 5 is SEMs of the present product as resulting from Inventive Example 2 below. FIG. 5 shows a titanium oxide mica platelet with a silane treatment followed by the addition of aluminum oxide. X-ray elemental analysis using the Energy Dispersive Spectroscopy (EDS) technique on the clusters present on the pigment surface showed an increase in aluminum content when compared to a region where no clusters are present. This analysis clearly indicates the presence of aluminum oxide on the surface of the pigment. Stereo electron microscopy of two micrographs indicated that some of the aluminum oxide particles can be embedded in the titanium oxide grains.

Preferably, the fumed aluminum oxide is present at about 0.5 to about 2.5 weight percent of the preceding described treated pigment. The aluminum oxide in the present invention has a primary particle size of 13 nm and a surface area of $100\pm15$ meters$^2$/gram. In addition, aluminum oxide particle with a surface area of 55 meters$^2$/gram also may be used in the present invention.

A carbon nanotubule is known as a microscopic fibrillar tube having a nanometer size in diameter. The carbon nanotubule comprises a single or coaxial monoatomic sheets cylindrically bent around a center axis of the tubule and a cylindrical center space or a cylindrical hollow defined by the sheet. The monoatomic sheet comprises a graphite carbon monoatomic sheet. Such carbon tubule is such an extremely slender carbon fibril as having a nanometer size in diameter. The individual monoatomic sheets are coaxially arranged to be separated by a distance in the radial direction. The micron-sized carbon fibril has been well known in the prior art. The nanometer sized carbon fibril was first reported in 1991 Nature, Vol. 354, pp. 56-68. Carbon nanotubule coating may dissipate the charge built up on the pigment during its transport to the spray gun. The nano particles may have the added advantage of functioning as a leveling agent by changing the surface energy of the pigment as well.

Resin:

The preceding mixture is placed in a paint can with a baffle and shaken on a paint shaker until the aluminum oxide is well dispersed. The aluminum oxide may also be dispersed with the use of a blender that can generate shear such as the Patterson-Kelly or the Littleford Day blender. The resulting dispersion or powder coating precursor is then formulated with powder coating resins and shaken for 5-10 minutes. Useful powder coating resins include polyester TGIC-polyester TGIC-free, and urethane. Typically, the powder mixes have about 1 to about 8 weight percent of the present product in the resin. The powder is sprayed out using a Gema pedestal corona gun or a gravity feed gun and the resulting sprayed panels are cured at about 400° F.

Utility:

The present composition is useful in any application where pearlescent pigments have been used heretofore. Thus, the products of this invention have an unlimited use in all types of automotive and industrial paint applications, especially in the organic color coating and inks field where deep color intensity is required. For example, these pigments can be used in mass tone or as styling agents to spray paint all types of automotive and non-automotive vehicles. Similarly, they can be used on all clay/formica/wood/glass/metal/enamel/ceramic and non-porous or porous surfaces.

Analytical Test Methods:

Scanning Electron-imaging Microscopy (SEM): The instrument used to obtain SEM images is JEOL 100CXII with an ASID4D scanning attachment and the operating voltage was 100KV. The sample powders were dispersed in water, hand agitated, applied with a dropper onto a conductive grid with a support film, and air-dried.

Energy Dispersive Spectroscopy (EDS): EDS was obtained using a Kevex Sigma 2 with an ultrathin window angled at 30 degrees. Stereo electron microscopy using two micrographs of the same area with a 10 degree difference In viewing angle were taken and the stereo effect was obtained using mirror stereoscope Type F-71 manufactured by Alan Gordon Enterprises, Inc.

In order to further illustrate the present invention, various non-limiting examples are set forth below. In these examples, as throughout the specification and claims, all parts and percentages are by weight and all temperatures in ° C., unless otherwise indicated.

COMPARATIVE 1

Exterior MEARLIN® MAGNAPEARL® 1109 product (contains mica (64-77 weight percent), $TiO_2$ (22-34 weight percent), $Cr(OH)_3$ (0.5-1 weight percent), and $Sn0_2$ (0.2-1.0 weight percent)) supplied by Engelhard Corporation was used as the pearlescent pigment; this pearlescent pigment did not contain a silane coupling agent. We did not add aluminum oxide to the pearlescent pigment. Polyester TGIC resin was used; this resin did not contain aluminum oxide. The pearlescent pigment was used at 8% loading in the polyester TGIC resin system resulted in pigment separation at the gun tip during spray out. The accumulated pigment at the tip would then shoot off onto the powder-coated part, which results in defective parts. The subsequent addition of alumina oxide did not help the pigment separation problem.

COMPARATIVE 2

A titanium dioxide coated mica with a surface treatment consisting of aluminum hydroxide, phenylalanine and lauric acid according to commonly assigned U.S. Pat. No. 6,245,323 was used as the pearlescent pigment. This pearlescent pigment did not have silane coating. The pearlescent pigment was dry blended at 8% with polyester TGIC-free resin also had pigment build up problem at gun tip during spray out. The resin did not contain aluminum oxide. The addition of aluminum oxide did not help the spray issues.

COMPARATIVE 3

Commercially available pigments with silane treatment did not spray out well at 8% loading in a polyester TGIC-free resin system. The resin did not contain aluminum oxide. Both products with and without the addition of aluminum oxide had pigment separation at the gun tip.

COMPARATIVE 4

A commercially available pearlescent pigment having a silane treatment had an average particle size of about 20 microns. We did not add aluminum oxide to this pearlescent pigment. This pearlescent pigment was combined with polyester resin at 8% loading and powder sprayed onto a panel. The resin did not contain any aluminum oxide. During powder spray out, build-up of pearlescent pigment was noticed at the tip of the spray gun and after curing, the sprayed panel had an "orange-peel" like appearance. When the pearlescent pigment was first combined with 2% aluminum oxide and then mixed with polyester resin, a significant improvement in the powder coated panel appearance was noticed.

COMPARATIVE 5

A titanium dioxide coated mica with a surface treatment consisting of cerium hydroxide/polymer network was mixed together with aluminum oxide and polyester TGIC-Free resin system. Powder spray out of the 3-component mixture showed no improvement of the coated panel after curing. The lack of improvement of the powder coated surface when all 3 components are mixed together proves that it is necessary to modify the pigment surface before the addition of the resin system. The mere presence of aluminum oxide does not lead to an improvement of the powder coated panel.

INVENTIVE EXAMPLE 1

197 grams of EXTERIOR CFS MEARLIN® MAGNAPEARL® 1103 product (contains platelets of mica (61-77 weight percent) coated with titanium dioxide (22-34 weight percent), coated with cerium hydroxide/polymer network (1-4 weight percent), and stannic oxide (less than one weight percent)) supplied by Engelhard Corporation was selected as the silane coated pearlescent pigment. The silane coating was made from two silanes with different organo functional groups. The silane coated pearlescent pigment was mixed with 3 grams of fumed aluminum oxide having a primary particle size of 13 nm and a surface area of 100 meters$^2$/gram for 20 minutes in a 5 quart paint can with a baffle to form a powder coating precursor. The average particle size of the resulting product was 17-20 µm.

The following resins were used: polyester TGIC, polyester TGIC-free, and urethane. These resins did not contain aluminum oxide. This powder coating precursor was sprayed at 8% loading in each of the preceding resin systems onto a panel using a corona gun. No powder coating precursor separation occurred and the overall panel appearance was good.

INVENTIVE EXAMPLE 2

197 grams of Exterior CFS MEARLIN® MAGNAPEARL® 2103 product (contains platelets of mica (50-66 weight percent) coated with titanium dioxide (33-45 weight percent), coated with cerium hydroxide/polymer network (1-4 weight percent), and stannic oxide (less than one weight percent)) supplied by Engelhard Corporation was selected as the silane coated pearlescent pigment. The silane coating was made from two silanes with different organo functional groups. The silane coated pearlescent pigment was mixed with 3 grams of fumed aluminum oxide having a primary particle size of 13 nm and a surface area of 100 meters$^2$/gram to form a powder coating precursor. The average particle size of the resulting product was 8-10 µm. The powder coating precursor spray out at 8% powder coating precursor loading in the resins listed in Inventive Example 1 showed no separation or build up of the powder coating precursor at gun tip. The panel appearance after curing was smooth and of high quality.

INVENTIVE EXAMPLE 3

197 grams of Exterior CFS MEARLIN® MAGNAPEARL® 3103 product (contains platelets of mica (43-58 weight percent) coated with titanium dioxide (41-51 weight percent), cerium hydroxide/polymer network (1-4 weight percent), and stannic oxide (0.3-0.8 weight percent)) supplied by Engelhard Corporation was used as the silane coated pearlescent pigment. The silane coating was made from two silanes with different organo functional groups. The silane coated pearlescent pigment was mixed with 3 grams of fumed aluminum oxide having a primary particle size of 13 nm and a surface area of 100 meters$^2$/gram to form a powder coating precursor. The average particle size of the resulting product was 3.5-6.5 µm. The powder coating precursor spray out at 8% powder coating precursor loading in the resins listed in Inventive Example 1 above showed no separation or build up of the powder coating precursor at gun tip. The panel appearance after curing was smooth and of high quality with appearance similar to a metallic finish.

INVENTIVE EXAMPLE 4

197 grams of Exterior LUMINA® Turquoise T303D product (contains platelets of mica (28.3-40.3 weight percent) coated with titanium dioxide (58.7-66.7 weight percent), coated with cerium hydroxide/polymer network (1-4 weight percent), and stannic oxide (less than one weight percent)) supplied by Engelhard Corporation was used as the silane coated pearlescent pigment. The silane coating was made from two silanes with different organo functional groups. The silane coated pearlescent pigment was mixed with 3 grams of fumed aluminum oxide having a primary particle size of 13 nm and a surface area of 100 meters$^2$/gram to form a powder coating precursor. This powder coating precursor had an average particle size of 16.5 µm.

The following resins were used: polyester TGIC-free and urethane. These resins did not contain aluminum oxide. The powder coating precursor was sprayed out at 8% powder coating precursor loading in each of the preceding resin systems. There was no powder coating precursor build up at the gun tip and the panel appearance was of good quality. The addition of aluminum oxide resulted in brighter powder coated panels with higher chroma. A panel coated with the powder coating precursor increased in brightness by 21% and chroma by 12% at a measuring angle of 110°. At near specular angle, the brightness was increased by 20% and the chroma by 12%.

INVENTIVE EXAMPLE 5

197 grams of Exterior CFS MEARLIN® Super Copper 3503Z product (platelets of mica (46-65 weight percent) coated with iron oxide (34-50 weight percent), and coated with cerium hydroxide/polymer network (1-4 weight percent)), supplied by Engelhard Corporation was used as the silane coated pearlescent pigment. The silane coating was made from two silanes with different organo functional groups. The silane coated pearlescent pigment was mixed with 3 grams of fumed aluminum oxide having a primary particle size of 13 nm and a surface area of 100 meters$^2$/gram to form a powder coating precursor. This powder coating precursor had an average particle size of 16.4-19.4 µm.

The following resins were used: polyester TGIC-free and urethane. These resins did not contain aluminum oxide. The powder coating precursor sprayed out at 8% powder coating precursor loading in each of the preceding resin systems showed no build up at the gun tip and the panel appearance was of good quality.

INVENTIVE EXAMPLE 6

197 grams of Exterior CFS MEARLIN® Fine Pearl 1303V product (platelets of mica (53-64 weight percent) coated with titanium dioxide (34-41 weight percent), coated with cerium hydroxide/polymer network (1-4 weight percent), and stannic oxide (less than one weight percent)) supplied by Engelhard Corporation was used as the silane coated pearlescent pigment. The silane coating was made from two silanes with different organo functional groups. The silane coated pearlescent pigment was mixed with 3 grams of fumed aluminum oxide having a primary particle size of 13 nm and a surface area of 100 meters$^2$/gram to form a powder coating precursor. The powder coating precursor had an average particle size of 9.4-12.4 µm.

The resin used was polyester TGIC-free and did not contain aluminum oxide. The powder coating precursor spray out done in the polyester TGIC-free resin system showed no powder coating precursor build up at the gun tip and the panel appearance was of good quality.

INVENTIVE EXAMPLE 7

197 grams of Exterior CFS MEARLIN® Bright Silver 1303Z product (platelets of mica (65-75 weight percent) coated with titanium dioxide (24-30 weight percent), coated with cerium hydroxide/polymer network (1-4 weight percent), and stannic oxide (less than one weight percent)) supplied by Engelhard Corporation was used as the silane coated pearlescent pigment. The silane coating was made from two silanes with different organo functional groups. The silane coated pearlescent pigment was mixed with 3 grams of fumed aluminum oxide having a primary particle size of 13 nm and a surface area of 100 meters$^2$/gram to form a powder coating precursor. This powder coating precursor has an average particle size of 17.3-20.3 µm.

The following resins were used: polyester TGIC-free and urethane. These resins did not contain aluminum oxide. The powder coating precursor spray out of this powder coating precursor at 8% loading in each of the preceding resin systems showed no powder coating precursor separation at the gun tip and the panel appearance of good quality.

INVENTIVE EXAMPLE 8

197 grams of Exterior CFS MEARLIN® Super Red 4303Z product (platelets of mica (43-57 weight percent) coated with titanium dioxide (42-52 weight percent), coated with cerium and aluminum hydroxide/polymer network (1-4 weight percent), and stannic oxide (less than one weight percent)) supplied by Engelhard Corporation was used as the silane coated pearlescent pigment. The silane coating was made from two silanes with different organo functional groups. The silane coated pearlescent pigment was mixed with 3 grams of fumed aluminum oxide having a primary particle size of 13 nm and a surface area of 100 meters$^2$/gram to form powder coating precursor. The average particle size of the powder coating precursor was 15.3-20.3 µm.

The resin used was polyester TGIC-free and did not contain aluminum oxide. The powder coating precursor spray out of powder coating precursor at 8% in a polyester TGIC-free resin system showed very good spray properties. There was no powder coating precursor build up at the gun tip and the overall panel appearance was of good quality.

COMPARATIVE 6 AND INVENTIVE EXAMPLE 9

400 grams of MAGNAPEARL® 2100 pigment (56.5-64.5 weight percent mica, 35.5-41.5 weight percent rutile titanium dioxide, and 0.2-2.0 weight percent tin oxide) white-reflecting titanium coated mica with an average particle size of 7.8-10.9 microns were dispersed in 2.6 liters of distilled water and heated to 78° C. The pH of the slurry was adjusted to 6.5 followed by the addition of two silanes with different organo functional groups at 0.15 ml/min. The product was then filtered, washed and dried at 120° C. for 2 hours to form silane coated pearlescent pigment. 2 grams of aluminum oxide was blended with 100 grams silane coated pearlescent pigment to form powder coating precursor.

The resin used was polyester TGIC-free and did not contain aluminum oxide. A powder formulation of 8% powder coating precursor in a polyester TGIC-free resin was prepared. The powder spray out evaluation showed no build-up of the powder coating precursor at the spray gun. Powder coated panels of the silane treated titanium coated mica with and without aluminum oxide were compared. The addition of aluminum oxide provided a considerable improvement in the panel appearance.

INVENTIVE EXAMPLE 10

100 grams of MAGNAPEARL® 2100 pigment (56.5-64.5 weight percent mica, 35.5-41.5 weight percent rutile titanium dioxide, and 0.2-2.0 weight percent tin oxide] was used as the pearlescent pigment and mixed with 4% of each of the following: 2-aminoethyl-3-aminopropyltrimethoxysilane, 3-aminopropyltriethoxysilane, and isocyantopropyltriethoxysilane. Each of the three mixtures was dried at 120° C. and classified through a 325-mesh screen (under 40 microns). Part of the classified powder was combined with 2.0% aluminum oxide and other part was used for comparison purposes. Each silane coated pearlescent pigment with and without aluminum oxide was evaluated at 8% loading in a polyester TGIC resin system. The powder coated panels with the aluminum oxide on silane coated MAGNAPEARL® 2100 showed an improvement on panel appearance.

Various changes and modifications can be made in the process and products of the present invention without departing from the spirit and scope thereof. The various embodiments, which have been described herein, were for the purpose illustrated in the invention were not intended to limit it.

What is claimed is:

1. Powder coating precursor comprising: (a) pearlescent pigment coated with at least one silane coupling agent; and (b) leveling agent that is present on the outer surface of said silane coated pearlescent pigment wherein said pearlescent pigment (a) is metal oxide coated substrate and wherein said leveling agent (b) is aluminum oxide.

2. The powder coating precursor of claim 1 wherein said substrate is mica.

3. The powder coating precursor of claim 1 wherein said pearlescent pigment (a) is titanium dioxide coated mica or iron oxide coated mica.

4. The powder coating precursor of claim 1 wherein said pearlescent pigment is coated with at least two silane coupling agents.

5. The powder coating precursor of claim 1 wherein said leveling agent (b) is present at about 1.5 to about 2.5 weight percent based on said silane coated pearlescent pigment (a).

6. The powder coating precursor of claim 1 wherein said aluminum oxide has a surface area between about 50 meters$^2$/gram to about 120 meters$^2$/gram.

7. A powder coating compositions comprising the powder coating precursor of claim 1 and additionally comprising (c) polymer.

8. The powder coating composition of claim 7 wherein said polymer (c) is polyester or urethane.

9. A method of powder coating composition preparation comprising the steps of:
   (a) combining:
      (i) pearlescent pigment coated with at least one silane coupling agent; and
      (ii) leveling agent to form a powder coating precursor wherein said leveling agent is aluminum oxide and present on the outer surface of said silane coated pearlescent pigment; and
   (b) adding resin to said powder coating precursor (a).

10. The method of claim 9 wherein said pearle scent pigment is metal oxide coated substrate.

11. The method of claim 9 wherein said substrate is mica.

12. The method of claim 10 wherein said pearlescent pigment (a) is titanium dioxide coated mica or iron oxide coated mica.

13. The method of claim of claim 9 wherein said pearlescent pigment is coated with at least two silane coupling agents.

14. The method of claim 9 wherein said leveling agent is present at about 1.5 to about 2.5 weight percent based on said silane coated pearlescent pigment.

15. The method of claim 12 wherein said aluminum oxide has a surface area between about 50 meters$^2$/gram to about 120 meters$^2$/gram.

16. The method of claim 9 wherein said resin is polyester or urethane.

* * * * *